(12) United States Patent
Deschaseaux

(10) Patent No.: US 6,473,444 B1
(45) Date of Patent: Oct. 29, 2002

(54) ASSEMBLY DEVICE FOR A LASER HEAD

(75) Inventor: Gérard Deschaseaux, La Source (FR)

(73) Assignee: Commissariat a l'Energie Atomique, Paris (FR)

(*) Notice: Subject to any disclaimer, the term of this patent is extended or adjusted under 35 U.S.C. 154(b) by 0 days.

(21) Appl. No.: 09/508,627
(22) PCT Filed: Sep. 15, 1998
(86) PCT No.: PCT/FR98/01966
§ 371 (c)(1),
(2), (4) Date: Apr. 3, 2000
(87) PCT Pub. No.: WO99/14831
PCT Pub. Date: Mar. 25, 1999

(30) Foreign Application Priority Data

Sep. 16, 1997 (FR) ............................................. 97 11492

(51) Int. Cl.⁷ .............................. H01S 3/03; H01S 3/06; H01S 3/091; H01S 3/20; H01S 3/00
(52) U.S. Cl. .............................. 372/65; 372/66; 372/70; 372/38.06; 372/53
(58) Field of Search ........................ 372/36, 75, 38.06, 372/43, 53, 65, 66, 70, 38.07

(56) References Cited

U.S. PATENT DOCUMENTS 5,546,416 A    8/1996   Basu

FOREIGN PATENT DOCUMENTS

EP    0 798 827 A2    10/1997

OTHER PUBLICATIONS

PCT WO 97/18606,Le Garrec et al, Cooled Lser Diode Array Assembly, Mar. 22, 1997.*

Garrec et al., "High–average–power diode–array–pumped frequency–doubled YAG laser," vol. 21. No. 24, Dec. 1996, Optical Society of America.

* cited by examiner

Primary Examiner—Paul Ip
Assistant Examiner—Armando Rodriguez
(74) Attorney, Agent, or Firm—Thelen Reid & Priest LLP; Robert E. Krebs

(57) ABSTRACT

A laser bar assembly module having a metal base plate (20) to support a diode or a laser diodes strip (22), this base plate being provided with a groove or area (21) holding the diode or diodes strip in position, a support (24) on which the metal base plate is installed, this support being provided with a flat laser bar bearing surface (26), this flat surface projecting along a direction perpendicular to it beyond the groove or area (21) holding the diode or diodes strip in position.

7 Claims, 3 Drawing Sheets

ASSEMBLY DEVICE FOR A LASER HEAD

TECHNICAL FIELD AND PRIOR ART

The invention relates to the development of modular elements and the assembly of those modular elements in order to make an assembly device for a laser amplifying head, particularly a diode pumped head.

Known assemblies used to make a diode pumped laser amplifying head are formed as illustrated in FIGS. 1A (front view) and 1B (side view) of a sole plate 2 on which a bracket 4 is fixed supporting all elements of the head. A hole in the vertical part of the bracket enables passage of a laser bar 6. Adjustable flanges 8 on each side around the hole position the bar vertically and horizontally. Previously assembled sectors 10 act as a support for the stacks 12 of diodes or diode strips. These sectors are also adjustable in position with respect to bar 6.

All parts are metallic, in order to enable heat to escape from the bar and diodes through sole plate 2. The bracket 4 may also be provided with a water circulation to improve heat exchange in order to enable use of laser head at a high rate.

In order to improve the efficiency of a laser, it may necessary to increase the gain. Consequently, the length of the bar may be doubled, and a second bracket with four diode sectors may be placed adjacent to the first bracket as shown in FIG. 2.

The assembly of a single head (as shown in FIGS. 1A and 1B) is relatively easy, since all elements are visible and accessible on each side of the bracket. The assembly of a double head (as shown in FIG. 2) is not so easy; the two brackets are close to each other, consequently elements located between them are inaccessible and their positioning is very difficult. The lack of visibility also causes considerable uncertainty about the adjustment quality of the diodes facing the bars.

Another assembly solution could consist of assembling two single heads separately, replacing the bar by a plastic or metal template. Subsequently, the two heads could be assembled by putting the long bar into place. The diodes would thus be correctly positioned. However this solution does introduce the risk that diodes could be deteriorated as the templates are removed or during assembly of the bar.

DESCRIPTION OF THE INVENTION

Therefore, there is a problem in finding a simple and practical mechanical system capable of overcoming the disadvantages mentioned above.

In particular, this system must preferably enable an assembly of diodes in the correct position with respect to the bar, on a metal support, this assembly enabling a visual check of the position of the diodes and their electrical and optical operation.

Furthermore, preferably, with this type of assembly it would be possible to place the support-diode-bar-wiring assembly on a sole plate, limiting the risks of deterioration of the diodes and the laser bar.

Preferably, the bar is held in place with maximum contact on the metallic part in order to improve heat exchanges.

A mechanical system according to the invention should preferably be compatible with water circulation in order to control the head temperature.

In order to make a laser bar attachment device, the first purpose of the invention was a laser bar assembly module comprising:

- a metal base plate to support a diode or a laser diodes strip, this base plate being provided with a groove or area holding the diode or diodes strip in position,
- a support on which the metal base plate is installed, this support being provided with a flat laser bar bearing area, this flat area projecting along a direction perpendicular to it beyond the groove or area holding the diode or diodes strip in position.

This type of support may also have two support ends in its part opposite the flat bearing surface.

Assembly holes may be formed in the ends of the support.

Another purpose of the invention is a device for attachment of a laser bar comprising at least four assembly modules such as described above, the bearing surfaces of the different assembly modules facing each other in pairs.

BRIEF DESCRIPTION OF THE DRAWINGS

In any case, the characteristics and advantages of the invention will become clearer after reading the following description. This description relates to example embodiments given for explanatory purposes and in no way restrictive, with reference to these attached drawings in which.

DETAILED DESCRIPTION OF EMBODIMENTS OF THE INVENTION

A laser bar attachment device according to the invention is a modular system containing several individual assembly modules.

Figure 1A:
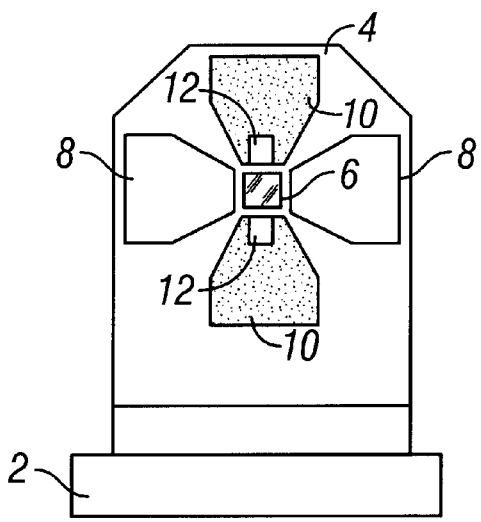
FIGS. 1 and 2 show assembly devices for a laser bar according to prior art.
Figure 1B:
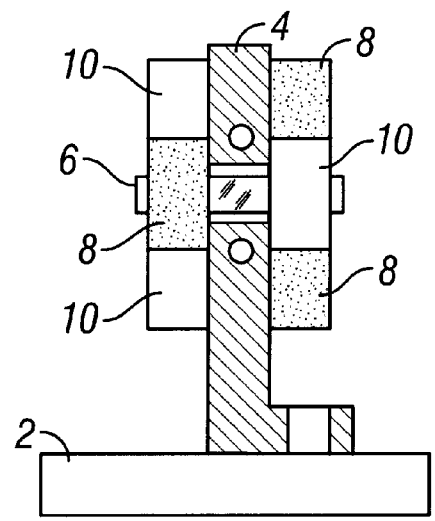
Figure 2:
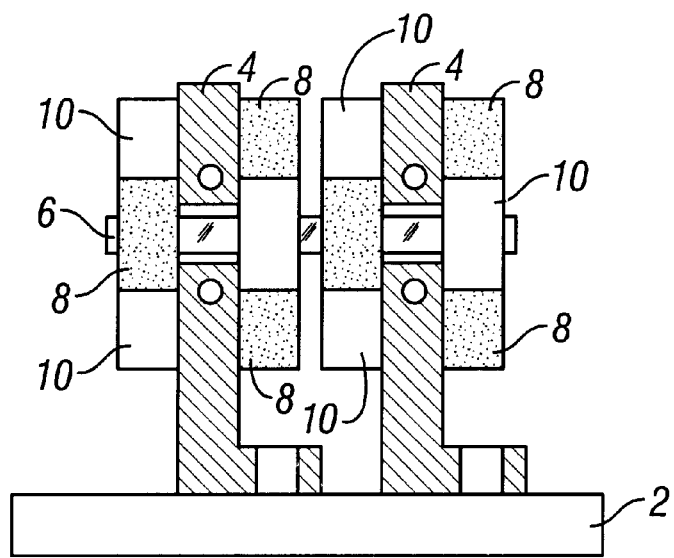
Figure 3:
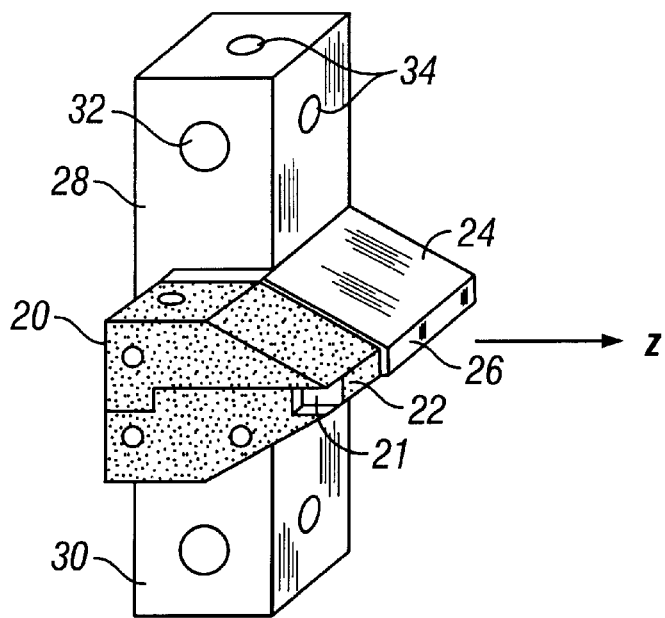
FIG. 3 shows an assembly module for a laser bar according to the invention.

An assembly module used in accordance with the invention is shown diagrammatically in FIG. 3. This type of module comprises firstly a metal base 20 that can support a diode, or a laser diodes strip 22. The diode or strip is inserted in a groove, or area 21, holding the diode or strip in position.

In FIG. 3, the metallic base plate 20 is in the shape of a sector. It becomes wider starting from the bearing surface 21.

The metallic base is mounted on, or adjacent to, a support 24 that in particular includes a flat bearing surface 26 on which a laser bar is supported. This flat surface 26 projects beyond the groove along the Z direction that is approximately perpendicular to it with respect to the groove or area 21 holding the diode or diodes strip in position.

The shape of the support 24 also narrows towards the flat bearing surface 26.

This support 24 may be extended on each side, but in the part opposite to the flat bearing surface 26 (in other words in its widest contact area), by two support ends 28 and 30. Attachment holes 34 and/or guide holes 32 may be formed in each of these support ends, for assembly of the different modules with each other.

Figure 4:
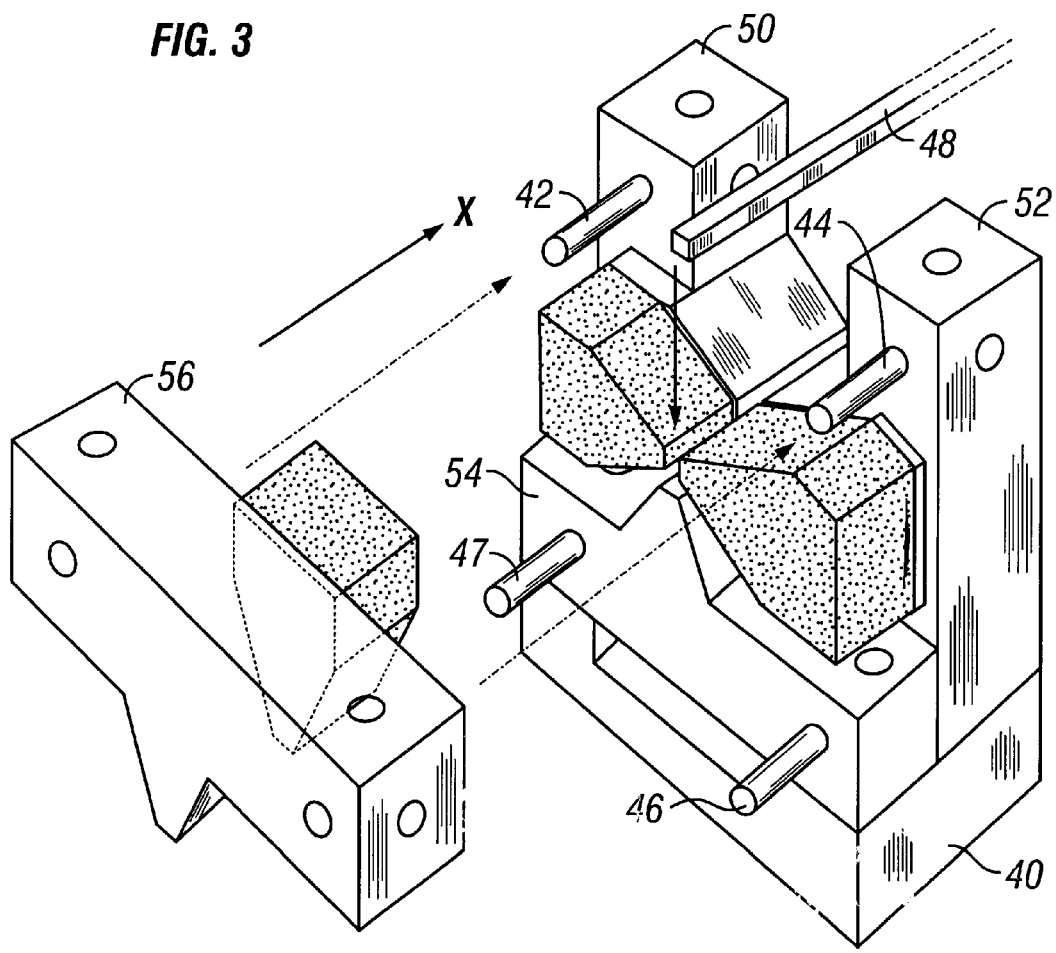
FIGS. 4 and 5 show how the assembly modules are assembled together according to the invention, to make a laser bar attachment device according to the invention.

As shown in FIG. 4, different modules may be assembled on a common sole plate 40. For example, they may be connected through cylinders 42, 44, 46, 47 placed in guide holes 32. Four modules 50, 52, 54, 56 form a head, or a device, for attachment of a laser bar 48. The different modules are associated in pairs, the bearing faces of the two modules in each pair being located facing each other. Thus, FIG. 4 shows modules 50, 52 and 54, 56 associated in pairs. The bar 48 may be put into place after having assembled three of the four modules, for example modules 50, 52, 54. The fourth module 56 then closes the assembly and fixes the bar 48 in position. Therefore, the operation consists of assembling the assembly modules, and does not introduce any accessibility and/or visibility problems. The assembly also includes a minimum risk of deteriorating diodes (or diode strips) and the bar 48. In the assembly of modules in pairs, it can be seen that the flat bearing surfaces of the two assembly modules 50, 52 in a first pair are parallel to each other and that they are in the direction of a plane perpendicular to the direction of the plane containing the flat bearing surfaces of the two modules 54, 56 in the other pair of assembly modules. The flat bearing surfaces of the two modules 54, 56 are also parallel to each other.

Therefore each pair of individual modules defines a laser bar support area between its two corresponding flat bearing surfaces. The support area defined by the pair of modules 50, 52 is offset along the X axis (parallel to bar 48) with respect to the support area defined by the pair of modules 54, 56. Similarly, the areas between the corresponding pairs of diode supports are offset along the same axis.

Figure 5:
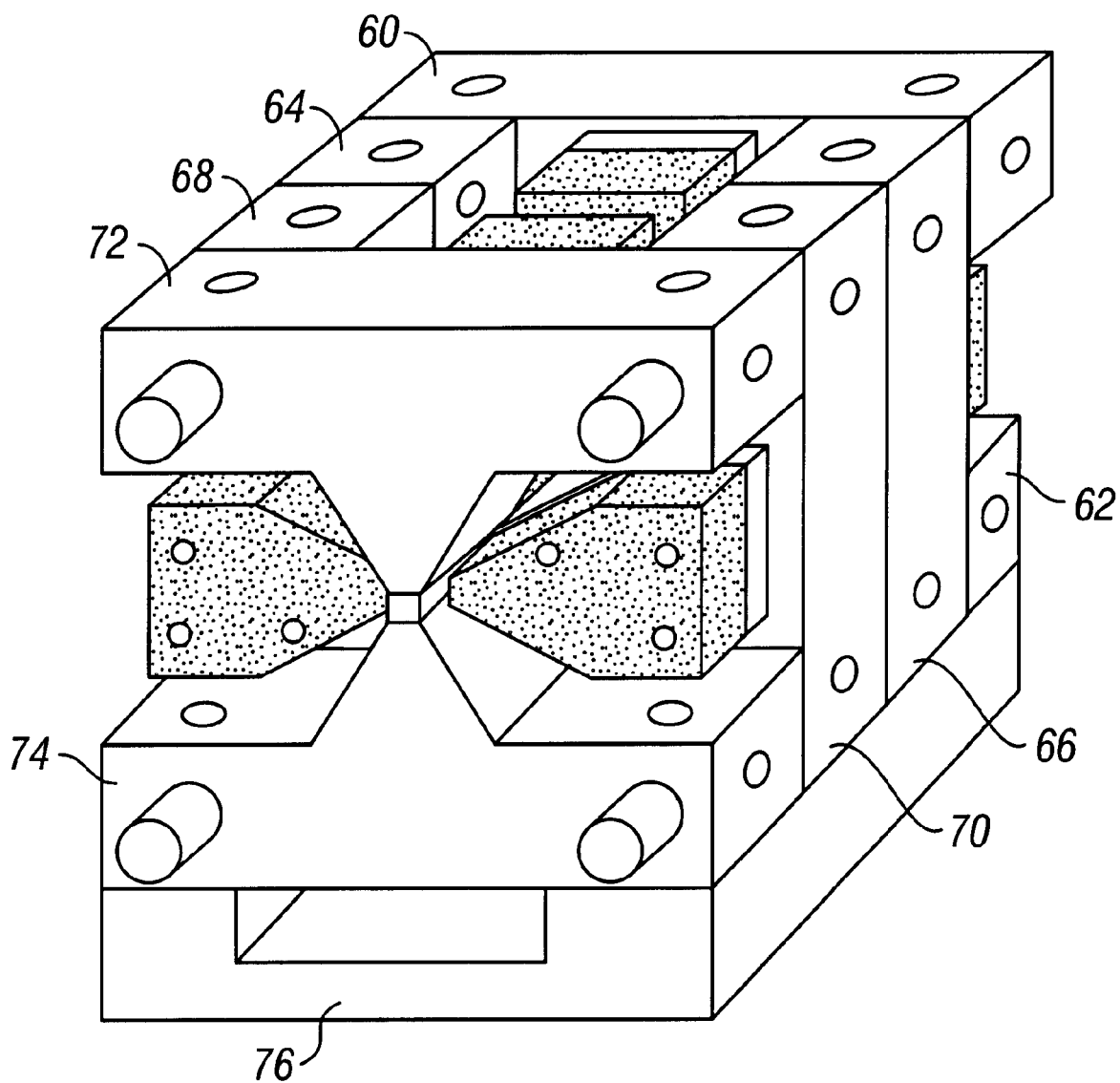

A double head, or double device for attachment of a laser bar may be obtained by assembling eight modules 60, 62, 64, 66, 68, 70, 72, 74 on a sole plate 76, as shown in FIG. 5.

In general, regardless of the envisaged embodiment, the assembly cylinders 42, 44, 46 may be replaced by tubes in order to circulate a temperature regulation fluid.

The attachment device described above can be upgraded and may be suitable for the assembly of bars with different dimensions and for other types of diodes by adapting the size and shape of module supports.

For example, this type of device is perfectly suitable for the assembly of a square bar with a side of 4 mm and 80 mm long with eight modular elements.

With the assembly conform with the invention, a visual check is made of the position of diodes and their operation (electrical and optical). The risks of deterioration of diodes and the laser bar are limited. Finally, the system is compatible with water circulation enabling temperature regulation.

What is claimed is:

1. Laser bar assembly module comprising:
    a metal base plate (20) to support a diode or a laser diodes strip (22), this base plate being provided with a groove or area (21) holding the diode or diodes strip in position,
    a support (24) on which the metal base plate is installed, this support being provided with a flat laser bar bearing surface (26), this flat surface projecting along a direction perpendicular to it beyond the groove or area (21) holding the diode or diodes strip in position, and
    at least four assembly modules (50, 52, 54, 56), the bearing surfaces of the different assembly modules facing each other in pairs.

2. Assembly module according to claim 1, the support (24) also having two support ends (28, 30) in its part opposite the flat bearing surface.

3. Assembly module according to claim 2, assembly holes (32) also being formed in the ends of the support.

4. Assembly module according to claim 2, attachment holes (34) also being formed in the ends of the support.

5. Device for attachment of a laser bar according to claim 1, the assembly modules being grouped in pairs, the flat bearing surfaces of the two modules in a first pair (50, 52) being parallel to each other and along the direction of a plane perpendicular to the direction of the plane containing the flat bearing surfaces of the second pair of modules (54, 56) that are also parallel to each other.

6. Attachment device according to claim 1, the assembly modules being grouped in pairs, each pair of modules defining a laser bar support area between its two corresponding flat bearing surfaces, the two support areas being defined by the two pairs of modules being offset from each other along a laser bar positioning axis.

7. Device for attachment of a laser bar comprising at least four assembly modules (50, 52, 54, 56) according to claim 4, the bearing surfaces of the different assembly modules facing each other in pairs.

\* \* \* \* \*